United States Patent [19]

Sadlak

[11] 3,798,554

[45] Mar. 19, 1974

[54] DIGITAL SEQUENTIAL CIRCUIT

[76] Inventor: Zbigniew Sadlak, Komandorska 82/14, Wroclaw, Poland 53345

[22] Filed: Dec. 29, 1971

[21] Appl. No.: 213,321

[52] U.S. Cl. .................................... 328/43, 328/48

[51] Int. Cl. .......................................... H03k 21/00

[58] Field of Search ........... 307/220, 223, 224, 225; 328/41, 43, 45, 48

[56] References Cited

UNITED STATES PATENTS

| | | | |
|---|---|---|---|
| 3,277,380 | 10/1966 | Paufve | 328/43 |
| 3,051,855 | 8/1962 | Lee | 328/43 X |
| 3,277,380 | 10/1966 | Paufve | 328/43 X |
| 3,345,574 | 10/1967 | Hilberg | 307/224 R X |
| 3,478,273 | 11/1969 | Duncan et al. | 328/48 X |
| 3,566,244 | 2/1971 | Baude | 307/223 X |

*Primary Examiner*—John S. Heyman
*Assistant Examiner*—R. E. Hart
*Attorney, Agent, or Firm*—Eric H. Waters

[57] ABSTRACT

A multi-state digital sequential circuit of unified logic elements provided for sequential testing of single-bit signals and passing into selected states or producing single-bit output signals according to arbitrarily present algorithm. The circuit consists of a plurality of unified elements comprising interconnected flip-flops, inverters, AND-circuits, and OR circuits.

3 Claims, 2 Drawing Figures

DIGITAL SEQUENTIAL CIRCUIT

FIELD OF THE INVENTION

This invention relates to digital sequential circuits of unified structural elements adapted to realize various transition and output functions, and more particularly to digital sequential circuits, realizing various algorithms of an input signal sequential analysis and producing output signals dependent on such analysis.

PRIOR ART

Multi-state circuits of prior art, in particular those used in sequential control systems, employed a number of binary flip-flops and a plurality of logic circuits coupling these flip-flops. Prior art circuits had to be designed individually for any particular transition and/or output functions.

Another shortcoming of prior art multistate circuits, in particular those realizing more complex algorithms, is that their inner structures employed dissimilar special-purpose configurations which might not be used for different applications. Full design cycle was necessary for any distinct multi-state circuit. In addition, manufacturing, testing, and maintenance were very difficult due to the variety of configurations employed.

SUMMARY OF THE INVENTION

It is therefore an object of the invention to provide a multi-state digital circuit of unified logical structure, the circuit being designed for testing single-bit signals in sequence and for passing into selected states or producing single-bit output signals according to any preset algorithm.

This object and others are accomplished in accordance with preferred embodiments of the invention comprised of unified elements consisting of flip-flops, inverters, AND-circuits, and OR-circuits wherein the flip-flops, inverters, AND-circuits, and OR-circuits are interconnected according to the invention.

BRIEF DESCRIPTION OF THE DRAWING

This and other objects, features, and advantages of the invention will be apparent from the following detailed description of a preferred embodiment as illustrated in accompanying drawings in which.

DETAILED DESCRIPTION

Before considering the drawings in detail some basic definitions are introduced. An inverter is defined as a logical binary device whose single output has two states (referred to here as 0 and 1 states) and is a function of the state of its input such as, if, and only if, the input to the device is in the 0 state, the output will be caused to be in the 1 state. Conversely stated, the output of the device is caused to be in the 0 state if, and only if, its input is in the 1 state. And OR-circuit is defined as a logical binary device whose single output has two states (referred to here as 0 and 1 states and is a combination function of the state of its several inputs, such as, if, and only if, all of the inputs to the device are in the 0 state, the output will be caused to be in the 0 state. An AND-circuit is a logical binary device whose single output has two states (referred to here as 0 and 1 states) and is a combination function of the state of its severed inputs, such as, if, and only if, all of the inputs to the device are in the 1 state, the output will be caused to be in the 1 state.

Figure 1:
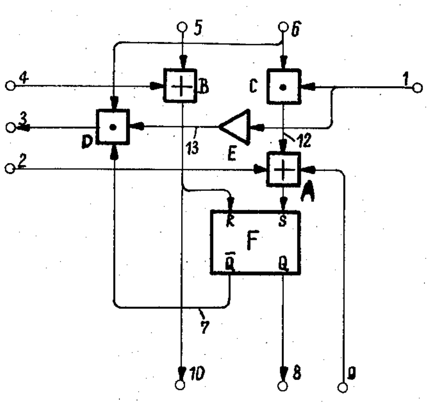
FIG. 1 is a schematic diagram illustrating interconnections in a single element of a multi-state circuit according to the invention.

Referring now to the drawings, FIG. 1 illustrates a single element of a multi-state circuit according to the present invention. The set input circuitry of a flip-flop F of any convenient type consists of an OR-circuit A and an AND-circuit C, and the reset input circuitry of the flip-flop F consists of an OR-circuit B. The output circuitry of the element consists of an AND-circuit D and an inverter E. The signal being tested is fed to the input terminal 1 of the element, and the output signal is produced at the output terminal 3 of the element. The input terminals 2 and 4 are, respectively, external unconditional set and reset input terminals, i.e., signals being fed to these terminals are able to, respectively, set and reset the flip-flop, whatever the signal being tested will be. Input terminals 5, 6, 9 and output terminals 8, 10 are provided for various inner control signals in the element.

In order to prepare the element for operation, the flip-flop F should be reset by applying a pulse signal to the input terminal 5. Then, if all external inputs and inner control signals inputs are in their 0 states, the output and all inputs of the flip-flop F will be in states entirely independent of the signal being tested. At the output terminal 3, a "0" signal is maintained. In such conditions, if a "1" signal is applied at the input terminal 6 only, the states of the flip-flop output and inputs will depend on the signal being tested. If the signal being tested is a "0," the flip-flop will not be set, and a "1" signal will be fed to the output terminal "3," until a "1" signal is applied to the input terminal 1. If the signal being tested, applied to the input terminal 1, changes to a "1," the flip-flop F will be set and an end of operation signal is fed to the output terminal 8, the signal at the output terminal 3 being a "0." In operation, therefore, the output signal will be transmitted when the signal being tested is a "0," and when the latter is a "1," there will be a transition to the next operation, the signal being interrupted or not transmitted. If a "1" signal is applied to the input terminal 2, the flip-flop will be set, whatever the conditions are.

Unconditional resetting of the flip-flop F functionally corresponds to preparing the element to repeat the operation of input signal testing. Unconditional setting of the flip-flop F functionally corresponds to omitting the operation performed by the element, i.e., missing a test of the input signal.

Figure 2:
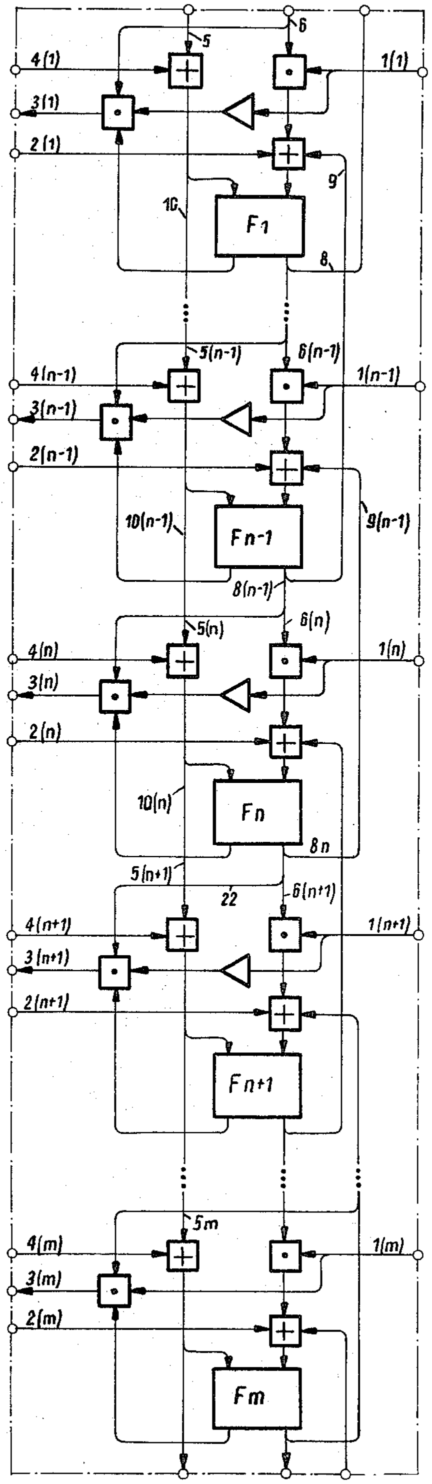
FIG. 2 is a schematic diagram illustrating part of a preferred embodiment of the invention.

In FIG. 2, interconnections of elements in a multi-state sequential circuit are illustrated. The circuit consists of *m* elements of type described hereabove with reference to FIG. 1. Each item shown in FIG. 2 will be hereafter referred to by an identification consisting of the identification number of the corresponding item shown in FIG. 1 and the number of the element in consideration put in brackets. The output terminal 8 $(n)$ of any element is connected to the input terminal 6 $(n+1)$ of the following element and to the input terminal 9 $(n-1)$ of the preceding one. The output terminal 10$(n)$ of any element, directly connected to the reset input $r(n)$ of the flip-flop in the element is connected to the reset input terminal 5$(n+1)$ of the following element.

Elements thus connected may operate in turn, which functionally corresponds to consecutive performing operations assigned to the elements.

Due to interconnection between the output terminal 8(*n*) of any element and the input terminal of the preceding one, a "1" state at the output of the flip-flop in any element resulting in setting the flip-flop in the preceding element and, in effect, any state changes in signals being tested or disturbances of states at outputs of any single flip-flop in elements corresponding to operations having been performed are not effective to change states of flip-flops so that such changes or disturbances have no effect on further operation of the circuit.

Applying a "1" signal to the 4(*n*) input of the element to reset unconditionally the flip-flop in the element will result in resetting any flip-flops set in the following elements. Functionally, this corresponds to repeating the operations having been performed, starting at the selected point.

Applying a "1" signal to the 2(*n*) input terminal of any element to set unconditionally the flip-flop in the element will result in setting any flip-flops reset in the preceding elements. Functionally, this corresponds to omitting operations having not been performed yet, up to the selected point.

While the invention has been described in detail above, it is not intended that the description should be all inclusive, but the invention should be limited only by the spirit and scope of the appended claims.

What is claimed is:

1. A multi-static digital circuit for producing a time sequence of control signals, said digital circuit comprising: a plurality of N flip-flops in ordered sequence, each of said flip-flops having at least two input terminals, the first of said input terminals being the set terminal, and the second one being the reset terminal and two complementary outputs; a plurality of N OR-circuits corresponding to said flip-flops, each OR-circuit including at least two input terminals and one output terminal, said set terminal of each flip-flop being connected to the output terminal of the corresponding OR-circuit of said plurality, a source of a set signal coupled to one of the input terminals of each OR-circuit, another of the inputs of each OR-circuit, except that corresponding to the first flip-flop in the sequence, being connected to an output of the next preceding flip-flop, a source of signals to be tested, a plurality of N AND-circuits, each having at least two input terminals and one output terminal, the set terminal of each flip-flop being connected via the corresponding OR-circuit to the output terminal of the corresponding OR-circuit to the output terminal of the corresponding AND-circuit, and input terminals of each AND-circuit being connected to an output terminal of the next preceding flip-flop in said sequence and to said source of signals, a second plurality of N OR-circuits each including at least two input terminals and one output terminal, said reset terminal of each flip-flop being connected to the output terminal of the corresponding OR-circuit of said second plurality, one input terminal of each OR-circuit of said second plurality being connected to the reset terminal of the next adjacent flip-flop in said sequence, and a source of reset signals coupled to the other input terminal of the latter said OR-circuits.

2. A circuit as defined in claim 1 and further comprising a plurality of N inverters corresponding to respective of said flip-flops and connected to said source of signals.

3. A circuit as defined in claim 2 and further comprising a second plurality of N AND-circuits each having at least three input terminals and one output terminal, a first and second input of each AND-circuit of said second plurality being connected to an output of the corresponding flip-flop, a third input terminal of each AND-circuit of the second plurality being connected to the output terminal of the corresponding inverter, the output terminal of each latter said AND-circuit being a test output terminal.

* * * * *